(12) United States Patent
Manders et al.

(10) Patent No.: US 12,146,402 B2
(45) Date of Patent: Nov. 19, 2024

(54) ULTRASONIC IMAGING DEVICE AND METHOD FOR WELLS

(71) Applicant: DarkVision Technologies Inc., North Vancouver (CA)

(72) Inventors: Graham T. Manders, Vancouver (CA); Osman S. Malik, Vancouver (CA); Stephen E. Robinson, North Vancouver (CA); Jay Roderick Hope, Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 1078 days.

(21) Appl. No.: 15/737,122

(22) PCT Filed: Jun. 17, 2016

(86) PCT No.: PCT/CA2016/050716
§ 371 (c)(1),
(2) Date: Dec. 15, 2017

(87) PCT Pub. No.: WO2016/201583
PCT Pub. Date: Dec. 22, 2016

(65) Prior Publication Data
US 2018/0156025 A1  Jun. 7, 2018

Related U.S. Application Data

(60) Provisional application No. 62/180,729, filed on Jun. 17, 2015.

(51) Int. Cl.
*E21B 47/002* (2012.01)
*B06B 1/06* (2006.01)
(Continued)

(52) U.S. Cl.
CPC ........ *E21B 47/0025* (2020.05); *B06B 1/0625* (2013.01); *E21B 47/002* (2020.05);
(Continued)

(58) Field of Classification Search
None
See application file for complete search history.

(56) References Cited

U.S. PATENT DOCUMENTS 3,481,425 A     12/1969  Smith, Jr. et al.
4,180,791 A  *  12/1979  Tiemann .............. G01N 29/06
                                                     367/105
(Continued)

FOREIGN PATENT DOCUMENTS

CA     2979744 A1  *  9/2016  ............. G01F 1/663
CN     200985790 Y     12/2007
(Continued)

OTHER PUBLICATIONS

Zohreh, Movahed, Radzuan Junin, and Peter Jeffreys. "Evaluate the borehole condition to reduce drilling risk and avoid potential well bore damages by using image logs." Journal of Petroleum Science and Engineering 122 (2014): 318-330. (Year: 2014).*
(Continued)

*Primary Examiner* — Isam A Alsomiri
*Assistant Examiner* — Jonathan D Armstrong

(57) ABSTRACT

Methods and devices for imaging wells using ultrasound is described. The devices include a modular imaging device having a telemetry module and a radial imaging module and/or forward imaging module. The radial imaging module includes a ring shaped phased array ultrasonic transducer array for generating images on the length of a wellbore. Various lens and housing configurations for the radial imaging module are described. The forward imaging module includes an ultrasonic transducer comprising one or more
(Continued)

elements and having an adjustable viewpoint for generating images of obstructions found in a wellbore. Advanced imaging modes for a radial imaging module include multiple aperture and spiral wave imaging mode.

21 Claims, 7 Drawing Sheets

(51) Int. Cl.
G01N 29/024 (2006.01)
G01N 29/24 (2006.01)
G01N 29/26 (2006.01)
G01N 29/34 (2006.01)
G01V 1/00 (2024.01)
G01V 1/46 (2006.01)
G01V 1/52 (2006.01)

(52) U.S. Cl.
CPC ....... *G01N 29/024* (2013.01); *G01N 29/2437* (2013.01); *G01N 29/262* (2013.01); *G01N 29/341* (2013.01); *G01V 1/006* (2013.01); *G01V 1/46* (2013.01); *G01V 1/52* (2013.01)

(56) References Cited

U.S. PATENT DOCUMENTS

| | | | |
|---|---|---|---|
| 4,255,798 A * | 3/1981 | Havira | G01V 1/44 367/35 |
| 4,905,203 A | 2/1990 | Sims et al. | |
| 4,947,683 A | 8/1990 | Minear et al. | |
| 5,212,353 A | 5/1993 | Rambow et al. | |
| 5,363,343 A * | 11/1994 | Klein | G01V 1/201 114/21.3 |
| 5,402,855 A * | 4/1995 | Gondouin | E21B 7/065 175/21 |
| 5,555,534 A * | 9/1996 | Maslak | G01S 15/8927 367/135 |
| 5,640,371 A | 6/1997 | Schmidt et al. | |
| 5,947,051 A * | 9/1999 | Geiger | B62D 57/00 114/313 |
| 6,018,496 A * | 1/2000 | Stanke | G01V 1/50 367/35 |
| 6,171,248 B1 * | 1/2001 | Hossack | A61B 8/12 600/447 |
| 6,287,260 B1 * | 9/2001 | Hascoet | G01F 1/667 600/454 |
| 6,295,872 B1 | 10/2001 | Van Der Heide | |
| 6,378,387 B1 * | 4/2002 | Froom | G01M 5/0075 73/865.8 |
| 6,483,777 B1 | 11/2002 | Zeroug | |
| 6,829,947 B2 | 12/2004 | Han et al. | |
| 6,909,666 B2 | 6/2005 | Dubinsky et al. | |
| 6,985,086 B2 | 1/2006 | Tang et al. | |
| 7,460,435 B2 | 12/2008 | Garcia-Osuna et al. | |
| 7,513,873 B2 | 4/2009 | Shifrin | |
| 7,617,052 B2 | 11/2009 | Van Kuijk et al. | |
| 7,626,886 B2 | 12/2009 | Dubinsky et al. | |
| 7,913,806 B2 * | 3/2011 | Pabon | G01V 1/523 181/104 |
| 8,243,280 B2 * | 8/2012 | Dubois | G01B 11/16 356/502 |
| 8,260,554 B2 | 9/2012 | Morys | |
| 8,294,758 B2 | 10/2012 | Lynde | |
| 8,611,183 B2 | 12/2013 | Winkler et al. | |
| 8,894,580 B2 * | 11/2014 | Kisner | G01N 29/262 600/443 |
| 8,923,092 B2 | 12/2014 | Vu et al. | |
| 9,164,066 B1 * | 10/2015 | Bossi | G01N 29/225 |
| 9,250,213 B1 * | 2/2016 | Bossi | G01N 29/265 |
| 11,084,169 B2 * | 8/2021 | Graham | B25J 9/1664 |
| 2003/0163046 A1 * | 8/2003 | Nohara | G01S 15/8927 600/443 |
| 2004/0013471 A1 * | 1/2004 | Matthews | G01S 15/89 405/154.1 |
| 2004/0254463 A1 | 12/2004 | Lehman | |
| 2005/0120803 A1 * | 6/2005 | Sokol | G01N 29/2418 73/801 |
| 2007/0044559 A1 * | 3/2007 | Andrews | G01N 29/4427 73/584 |
| 2009/0010285 A1 * | 1/2009 | Dubois | G10K 15/046 356/614 |
| 2009/0213690 A1 | 8/2009 | Steinsiek et al. | |
| 2009/0299194 A1 | 12/2009 | Matsuzawa | |
| 2010/0059219 A1 | 3/2010 | Roberts et al. | |
| 2010/0095757 A1 * | 4/2010 | Hansen | G01V 1/50 73/152.16 |
| 2011/0080805 A1 * | 4/2011 | Vu | G01V 1/46 367/32 |
| 2011/0087434 A1 | 4/2011 | Lie | |
| 2011/0139442 A1 * | 6/2011 | Ziauddin | E21B 49/08 166/250.01 |
| 2012/0120767 A1 | 5/2012 | Vu et al. | |
| 2012/0127830 A1 | 5/2012 | Desai | |
| 2012/0176862 A1 | 7/2012 | D'Angelo et al. | |
| 2012/0179377 A1 | 7/2012 | Lie | |
| 2014/0050046 A1 | 2/2014 | Sinha et al. | |
| 2014/0216727 A1 * | 8/2014 | Kasyanov | E21B 28/00 166/249 |
| 2014/0260589 A1 * | 9/2014 | Hallundbæk et al. | G01F 1/668 73/152.32 |
| 2015/0198733 A1 | 7/2015 | Lie | |
| 2016/0290847 A1 * | 10/2016 | Gronsberg | G01F 1/663 |
| 2018/0011211 A1 * | 1/2018 | Leonard | G01N 29/2456 |
| 2018/0073353 A1 * | 3/2018 | Malik | G01F 1/74 |
| 2019/0101663 A1 * | 4/2019 | Walters | E21B 47/14 |
| 2020/0190974 A1 * | 6/2020 | Manders | E21B 47/085 |
| 2020/0249203 A1 * | 8/2020 | Manders | G01N 29/225 |
| 2021/0096245 A1 * | 4/2021 | Kozuki | G01V 1/006 |

FOREIGN PATENT DOCUMENTS

| | | |
|---|---|---|
| CN | 101363314 A | 2/2009 |
| CN | 202943014 U | 5/2013 |
| CN | 102128028 B | 6/2013 |
| CN | 102128029 B | 6/2013 |
| CN | 104515807 A | 4/2015 |
| EP | 1348954 A1 | 10/2003 |
| EP | 2587227 A1 | 5/2013 |
| EP | 3151037 A1 | 4/2017 |
| JP | S5561192 A | 5/1980 |
| JP | H0473691 A | 3/1992 |
| JP | H0566785 A | 3/1993 |
| JP | 2009247416 A | 10/2009 |
| NO | 20131637 A1 | 6/2015 |
| NO | 338464 B1 | 8/2016 |
| WO | 2008098099 A2 | 8/2008 |
| WO | 2009/099333 A1 | 8/2009 |
| WO | 2010/151136 A1 | 12/2010 |
| WO | 2013/101694 A2 | 7/2013 |
| WO | 2013165569 A1 | 11/2013 |
| WO | 2014176483 A1 | 10/2014 |
| WO | 2015/050456 A1 | 4/2015 |
| WO | 2015/088351 A1 | 6/2015 |
| WO | 2015105977 A1 | 7/2015 |
| WO | 2016094132 A1 | 6/2016 |

OTHER PUBLICATIONS

Austeng, Andreas, et al. "Use of the minimum variance beamformer in synthetic aperture sonar imaging." Proceedings of Meetings on Acoustics ECUA2012. vol. 17. No. 1. Acoustical Society of America, 2012. (Year: 2012).*
Patent Cooperation Treaty, International Search Report for PCT/CA2016/050716 mailed Aug. 29, 2016, 6 pages.
Patent Cooperation Treaty, Written Opinion of the International Searching Authority for PCT/CA2016/050716 mailed Aug. 29, 2016, 5 pages.
"Ultrasonic Imaging and Velocimetry in Two-Phase Pipe Flow", Jun. 1993, Morriss & Hill.

(56) References Cited

OTHER PUBLICATIONS

"A New Era in Production Logging: Defining Downhole Flow Profiles", 2006, Elkadi & Zeybek.
Space Brochure R01/2011, Archer the Well Company.
Third Party Observations filed on PCT/CA2016/050716 dated Oct. 2, 2017.
"Ultrasound logging techniques for the inspection of sand control screen integrity", ICOTA 2011, Hyde-Barber et al.
"Captured by Space", ICOTA 2011, Tymons, Tobben.
GB Search and Examination Report received for application No. 1720986.7, mailed on Sep. 1, 2021, 6 pages.
Examination Report received for GB application No. 2202643.9, mailed on May 9, 2022, 4 pages.
Combined Search and Examination Report under Sections 17 and 18(3) received for GB Application No. GB2202641.3, mailed on Mar. 16, 2022, 4 pages.
Combined Search and Examination Report under Sections 17 and 18(3) received for GB Application No. GB2202642.1, mailed on Mar. 11, 2022, 5 pages.
Combined Search and Examination Report under Sections 17 and 18(3) received for GB Application No. GB2202643.9, mailed on Mar. 16, 2022, 6 pages.

\* cited by examiner

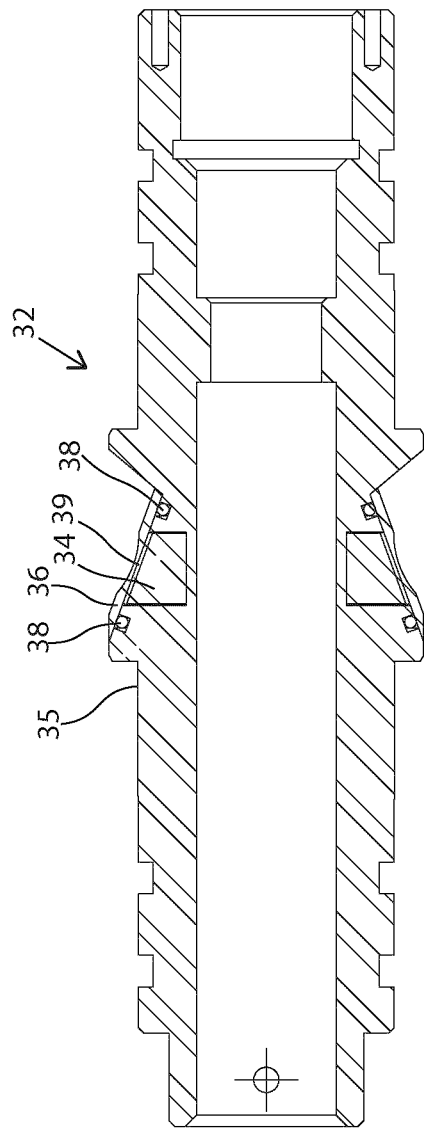
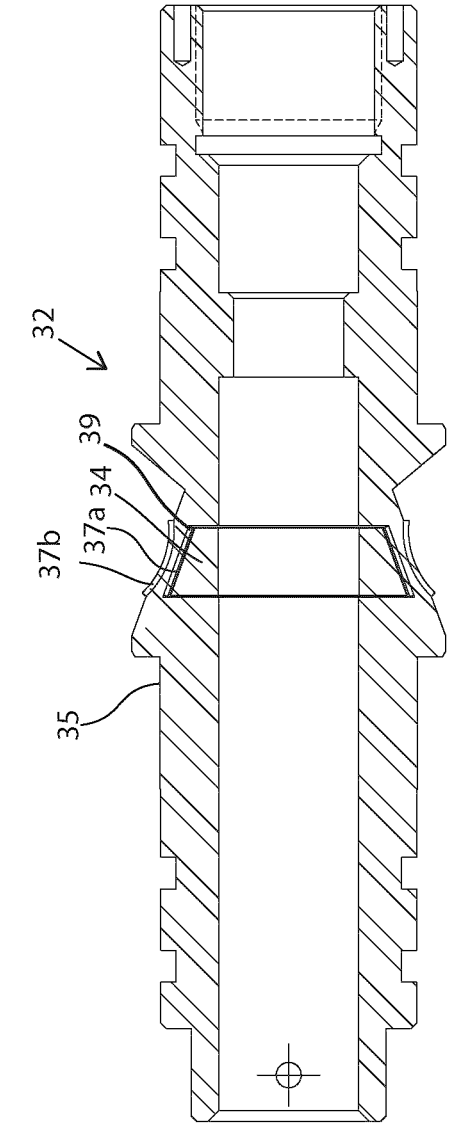
FIG. 3
FIG. 5
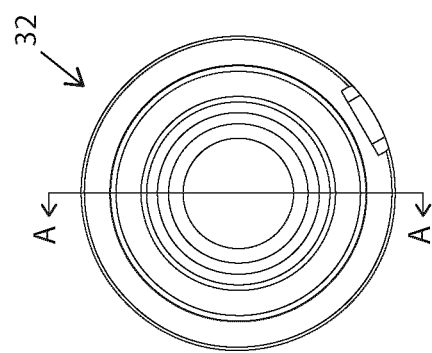
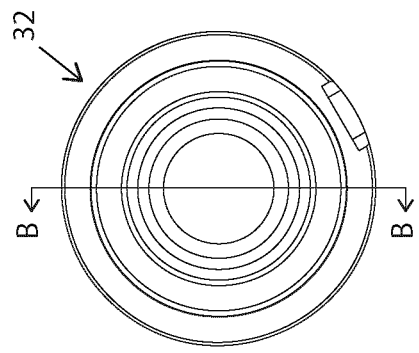
FIG. 2
FIG. 4

ULTRASONIC IMAGING DEVICE AND METHOD FOR WELLS

CROSS REFERENCE TO RELATED APPLICATIONS

This application is a national stage filing under section 371 of International Application No. PCT/CA2016/050716, filed on Jun. 17, 2016, published in English on Dec. 22, 2016, as WO2016/201583 A1 and which claims priority to U.S. Provisional Application No. 62/180,729, filed on Jun. 17, 2015, the entire disclosure of these applications being hereby incorporated herein by reference.

FIELD OF THE INVENTION

The invention relates to the imaging of wells, and more specifically to ultrasonic imaging of cased or open-hole wellbores.

BACKGROUND OF THE INVENTION

Downhole well imaging can provide valuable information and data on what is happening inside oil and gas wells at various stages of a well's life. The information and data can help make informed decisions regarding the well and can be useful for determining the condition of various assemblies and components in the well, either as a preventative measure or when there is a suspected integrity issue. Well imaging can also provide information on what fluids and other components are in the well, and can capture information on any obstructions in the well. The data gathered from well imaging is valuable for maximizing performance, recovery and efficiency of a well, while minimizing environmental and safety risks.

Prior art methods of well imaging, such as cameras, calipers, lead impression blocks and conventional ultrasonic imaging devices, all have limitations with regard to the quality of imaging data they can provide, and the speed at which they can obtain such data. For example, cameras have a limited speed with which they can move through a well and capture imaging data. They are generally only practical when the location of an integrity issue in a well is already known, and the camera simply needs to be deployed to that specific area to capture images. Cameras generally only work when there is clear water or gas in a well, which is rarely the case during many phases in the life of a well. Additionally, cameras are limited to 2D images, and cannot capture 3D images.

Calipers are also used in well imaging, but calipers are only able to provide low resolution 3D measurements of a well and cannot be used to obtain a detailed and intuitive image of a well. Lead impression blocks and other mechanical imaging means such as the fish-imaging system in U.S. Pat. No. 8,294,758 can be used to obtain imaging information on "fish" or obstructions in a well, but they can only give an impression of the surface of the obstruction without providing the orientation of the obstruction. The data these systems provide is of limited use when there are occlusions or obstructions with complex geometry.

Several oil and gas companies use an ultrasonic imaging device with a spinning head, for example the Ultrasonic Borehole Imager (UBI) by Schlumberger. These devices have limited speed at which they can operate, and generally only provide low resolution images at low frequencies.

The prior art contemplates imaging devices having a phased array design, such as U.S. Pat. No. 5,640,371 owned by Western Atlas International, Inc. and CN 101363314A. The design of these devices generally does not allow for high resolution images to be obtained, nor allow for high frequency imaging.

The prior art devices and methods for imaging obstructions in wells generally only allow for one vantage point or field of view to be used, typically straight on from the center of the well to the obstruction. This provides limited data on obstructions in wells and does not give a complete picture of the obstruction. In the case of ultrasound imaging devices, only having one vantage point can lead to missing imaging data due to occlusions and imprecise measurements due to ultrasonic artifacts.

There is generally a need for a well imaging tool that can provide high resolution images of a well, and a need for a tool that can do so in a fast and efficient manner. There is also a need for a tool that can better visualize obstructions in a well from more than one viewpoint, and provide higher resolution and more accurate images of obstructions.

SUMMARY OF THE INVENTION

In accordance with the invention, there are provided methods and devices for imaging wellbores using ultrasound.

In one aspect of the invention, there is provided a radial imaging module for imaging a wellbore using phased array ultrasound, the radial imaging module comprising a housing; a phased array ultrasonic radial imaging probe having an annular transducer array with a plurality of elements; and electronics for transmitting and receiving phased array ultrasound from the transducer array.

In one embodiment, the annular transducer array is conical shaped and has a cone angle of 0 to 45 degrees, preferably 5 to 25 degrees, and more preferably about 20 degrees.

In another embodiment, the annular transducer array has 32 to 2048 elements, and preferably 128 to 1024 elements. The radial imaging probe preferably operates in a frequency of 0.2 to 30 MHz, and in more preferably 1 to 10 MHz.

The transducer array may be made of a piezoelectric composite, such as lead zirconate titanate (PZT) or $BiScO_3$—$PbTiO_3$ (BSPT). The connectivity of the piezoelectric composite may be 1-3 or 2-2.

The radial imaging probe may be operable in 2D B-mode and/or Doppler mode.

The radial imaging probe may further comprise an acoustic lens covering an outer surface of the transducer array. The acoustic lens may be convex or concave. The acoustic lens may be a concave or convex logarithmic lens. When the acoustic lens is convex, it may be made of a material having a lower acoustic velocity than well fluid, such as 1300 m/s or less. For example, the convex acoustic lens may be made of room temperature vulcanization (RTV) silicone. When the acoustic lens is concave, it may be made of a material having a higher acoustic velocity than well fluid. The concave acoustic lens may be made of a material having an acoustic velocity of 1700 m/s or more. The concave acoustic lens may be made of polymethylpentene (PMP or TPX), poly ether ether ketone (PEEK), polytetrafluoroethylene (PTFE), polyimide (PI), polyphenylene sulfide (PPS).

The elevation of the transducer array elements may be 5 to 50 mm, and more preferably 9 to 15 mm. Each element of the transducer array may have a curved surface for modifying the focal point of the element.

The transducer array may be sealed between the housing and the acoustic lens. The housing of the radial imaging module may be substantially continuous around the transducer array to seal the transducer array within the housing. Preferably, there is at least one matching layer in the housing located outwardly from the transducer array for ensuring sufficient ultrasonic wave propagation to and from the transducer array. A first matching layer may be positioned around the outside of the transducer array and a second matching layer may be positioned around the outside of the housing. The matching layer may be ¼ to ½ wavelength thick. The housing may be made of titanium, aluminum bronze, beryllium copper, ceramic, ceramic composite, or carbon fiber composite.

In another aspect of the invention, there is provided a method for imaging a wellbore in a multiple aperture imaging mode using a phased array ultrasonic radial imaging probe having an annular transducer array comprising the steps of: a) transmitting and receiving an ultrasonic beam concurrently from each of at least two sub-apertures on the transducer array as the imaging probe is moved axially in the wellbore, each of the at least two sub-apertures comprising a plurality of individual elements; b) concurrently processing the received beam from each of the at least two sub-apertures to form signals; and c) appending the signals from each of the at least two sub-apertures to create a 3D image of the wellbore.

In a further aspect of the invention, there is provided a method for imaging a wellbore in a spiral wave imaging mode using a phased array ultrasonic radial imaging probe having an annular transducer array comprising a plurality of elements, the method comprising the steps of: a) pulsing a first element in the transducer array that forms part of a first sequence of elements; b) pulsing a second element that forms part of the first sequence of elements; c) repeating steps a) and b) for each element in the first sequence; d) receiving signals for each element in the first sequence; e) applying time delays to the received signals to achieve virtual beamforming and form imaging data; f) repeating steps a) to e) for additional sequences of elements in the transducer array; and g) coherently summing the imaging data from each sequence to form a 3D image of the wellbore. A time delay may be applied between steps a) and b) to create a wave front that spirals radially outward from the transducer array in a clockwise or counterclockwise direction. Alternatively, all the elements in a sequence are pulsed simultaneously to create a circular wave front that travels radially outward from the transducer array.

In a further aspect of the invention, there is provided a forward imaging module for imaging a wellbore using ultrasound, the forward imaging module comprising: a housing; an ultrasonic imaging probe having an adjustable viewpoint forward facing transducer for imaging an area in front of the probe; a control mechanism for adjusting the viewpoint of the forward facing transducer to enable imaging from various viewpoints; and electronics for transmitting and receiving ultrasound pulses from the transducer.

The transducer of the forward facing imaging module may comprise multiple elements arranged in a linear array or a 2D array. The transducer may be a phased array transducer. Alternatively, the transducer may comprise a single element. The viewpoint of the transducer may be mechanically adjusted by changing the physical position and/or angle of the transducer. The imaging probe may comprise an articulated arm on which the transducer is located for changing the position and/or angle of the transducer. Alternatively, the viewpoint of the transducer may be adjusted by electronically steering the elements. Alternatively, the viewpoint of the transducer may be adjusted using both mechanical and electronic steering.

In another aspect of the invention, there is provided a modular imaging tool comprising the radial imaging module described above and a telemetry module comprising power means, communication means and image processing means. Alternatively, instead of the radial imaging module in the module imaging tool, there is a forward facing imaging module as described above. Or, the module imaging tool may comprise both the radial imaging module and the forward facing imaging module.

In a further aspect of the invention, there is provided a method for imaging a section in a wellbore using a forward imaging module as described above comprising the steps of: a) imaging a first area in front of the transducer using ultrasound to obtain a first dataset; b) changing the viewpoint of the transducer and imaging a second area in front of the transducer from the new viewpoint using ultrasound to obtain a second dataset; and c) merging the first and second datasets to form an image of the section in the wellbore. In one embodiment, steps b) and c) are repeated one or more times to obtain further datasets obtained from various viewpoints. In step b), the viewpoint may be changed by mechanically changing the position and/or angle of the transducer. Alternatively, the viewpoint may be changed by electronically steering the elements of the transducer when the transducer comprises a plurality of elements. The imaging may be phased array ultrasound imaging.

BRIEF DESCRIPTION OF THE DRAWINGS

Various objects, features and advantages of the invention will be apparent from the following description of particular embodiments of the invention, as illustrated in the accompanying drawings.

FIG. 2 is a cross-sectional view taken along line C-C in FIG. 1 of a radial imaging probe having an acoustic lens.

FIG. 3 is a cross-sectional view taken along line A-A of the radial imaging probe of FIG. 2.

FIG. 4 is a cross-sectional view taken along line C-C in FIG. 1 of a radial imaging probe having a housing.

FIG. 5 is a cross-sectional view taken along line B-B of the radial imaging probe of FIG. 4.

DETAILED DESCRIPTION OF THE INVENTION

Figure 1:
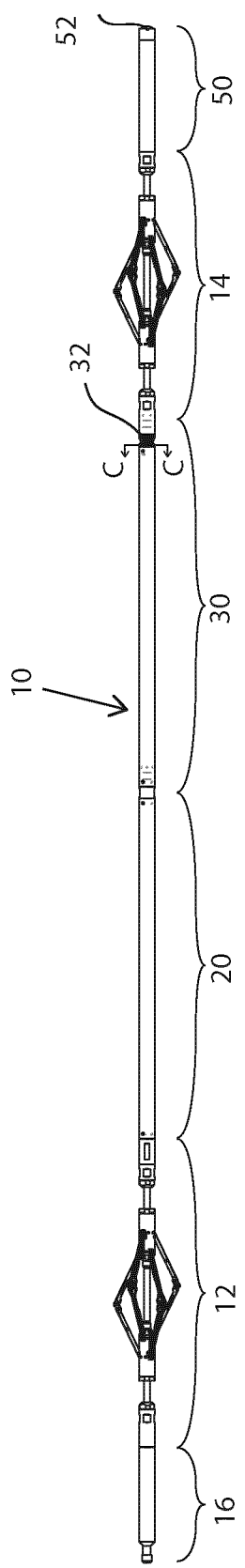
FIG. 1 is a plan view of an ultrasound imaging device.

Various aspects of the invention will now be described with reference to the figures. A number of possible alternative features are introduced during the course of this description. It is to be understood that, according to the knowledge and judgment of persons skilled in the art, such alternative features may be substituted in various combinations to arrive at different embodiments of the present invention. Wherever possible, similar reference numerals are used to refer to similar features.

With reference to the figures, an imaging device 10 and method for imaging a wellbore is described.

Overview of the Imaging Device

The imaging device 10 generally comprises at least one ultrasonic imaging system and associated processing electronics. Referring to FIG. 1, the imaging device is preferably a modular device with two or three main modules, including a telemetry module 20, a radial imaging module 30, and a forward imaging module 50. The imaging device may include either the radial imaging module, the forward imaging module, or both the radial and forward imaging module. The imaging modules use ultrasonic imaging, and may use phased array ultrasonic imaging.

The imaging device stores imaging data on board and can optionally transmit data in real time to the well surface via a wireline cable or using wireless communication technology. The imaging device may optionally include one or more centralizing elements 12, 14 for keeping the device centered in a well, and a cable head 16 for connecting to a wireline.

The telemetry module 20 includes the necessary electronic components for the imaging device, including power means (e.g. batteries and/or components for receiving power from the well surface), communication means, image processing means, an inertial measurement unit, and data logging means.

The radial imaging module 30 is primarily used to generate 3D images of the length of the well as the imaging device is moved axially through the wellbore. The forward facing imaging module 50 is primarily used to image obstructions in the well.

Imaging Modules

Each imaging module, whether it is the radial imaging module 30 or the forward imaging module 50, include an imaging probe having an ultrasonic transducer. The transducer comprises one or more elements for transmitting and receiving ultrasonic sound pulses. The transducer may include multiple elements wherein each element can transmit and receive pulses independently, in which case phased ultrasound may be used.

The imaging module also includes the necessary electronics for transmitting and receiving ultrasound pulses, timing the transmission of the pulses, converting analog signals to digital signals, and processing image data. The imaging probe can be run in 2D B-mode (brightness mode) to obtain an image of the structure and components located in the well. The imaging probe can also be run in Doppler mode to obtain information on fluid flow in the well. B-mode and Doppler mode can be run separately or concurrently.

Radial Imaging Module

Referring to FIGS. 2 to 5, the radial imaging module 30 generally includes a radial imaging probe 32, which is preferably a phased array ultrasound probe. The radial imaging probe 32 includes an annular ultrasonic transducer array 34 that extends around the circumference of the imaging device, preferably covering 360 degrees around the imaging device. The piezoelectric elements of the transducer array transmit and receive sound pulses radially around the imaging device as the imaging device is moved axially within a well. An image processor assembles the received pulses, i.e. the imaging data, to create a 3D image of a length of the well. The radial imaging probe can be operated in B-mode to obtain an image of the well, and/or in Doppler mode to obtain information on fluid flow in the well, and specifically on radial flow. B-mode and Doppler mode can be run simultaneously to obtain a 3D color Doppler image showing flow that can be overlaid on the B-mode image.

The annular transducer array preferably has a cone angle of 0 to 45 degrees. The illustrated embodiments show a cone angle of approximately 20 degrees, which is generally preferable for preventing reverberations within the liner or casing wall and thereby preventing echoes that occur between the liner or casing and tool from appearing in the resulting image. Twenty degrees is generally enough of an angle to ensure that the vast majority of the sound energy that reaches the probe is from direct reflections rather than multiple reflections (echoes). The multiple reflections will generally travel up or down the well and not affect the images. Alternatively, a cone angle of zero degrees can be useful for obtaining thickness measurements of the liner/casing wall.

The preferred probe design uses 128 to 1024 transducer elements at 1 to 10 MHz with 0.1 to 1 mm element spacing. Alternative designs use 32 to 2048 elements in the 0.2 to 30 MHz range. The elevation of the transducer elements is generally from 5 to 50 mm, and preferably 9 to 15 mm, depending on the size and geometry of the well.

The transducer array is preferably made of a piezoelectric composite material, including but not limited to lead zirconate titanate (PZT) and $BiScO_3$—$PbTiO_3$ (BSPT) piezoelectric ceramic materials. Preferably, the composite has a connectivity of 1-3 or 2-2.

Various methods can be used for sealing the transducer array 34 in a housing 35 of the radial probe 32. In one embodiment, shown in FIG. 3, an acoustic lens 36 is laid over the transducer array 34 and sealed, such as by using a pair of o-rings 38. In another embodiment, shown in FIG. 4, the housing 35 is continuous around the transducer array 34. In this case, at least one matching layer, and preferably two or more matching layers 37a, 37b are provided in the housing to ensure efficient sound transfer. In the illustrated embodiment, the first matching layer 37a is positioned directly around the transducer array, and the second matching layer 37b is positioned on the outside of the housing 38 surrounding the transducer array. The matching layers are preferably ¼ to ½ wavelength thick and selected from materials, preferably metallic materials, to provide maximum power transfer into and out of the housing.

The material for the housing 38 must be strong while preferably having an acoustic impedance close to the acoustic impedance of the piezoelectric composite that is used in the transducer. If a material having a similar impedance to the transducer is used, the first matching layer 37a is not necessarily needed. For example, if a 1-3 PZT composite having an acoustic impedance between 8 and 26 MRayl is used in the transducer, suitable housing materials having a similar acoustic impedance include titanium (~27 MRayl), aluminum bronze (~29 MRayl) and beryllium copper (~32 MRayl). Alternative non-metal materials such as ceramic, ceramic composites or carbon fibre composites are also suitable and their acoustic impedance can be 'tuned' to match the PZT composite.

Acoustic Lens

Various acoustic lenses 36 can be used in the radial imaging probe 32 to optimize the imaging performance of the probe. The lens shape and material is generally determined based on the application of the radial imaging probe and the specific well parameters.

Figure 6A:
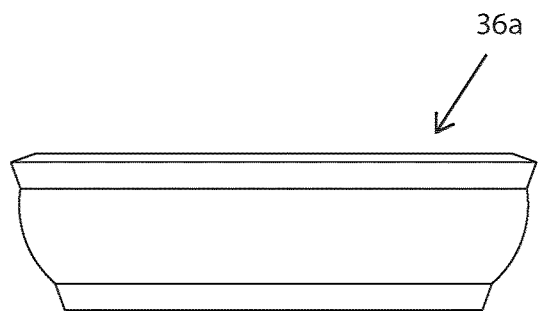
FIGS. 6A and 6B are side and perspective views, respectively, of a convex profile conical lens of a radial imaging probe.
Figure 6B:
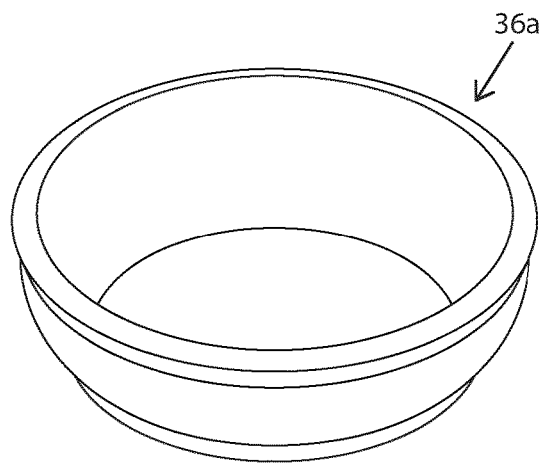

In one embodiment, shown in FIGS. 6A and 6B, a convex lens 36a is used in the radial probe 32. The convex lens is made of a material having an acoustic velocity less than the acoustic velocity of the fluid in the well. Typically, well fluid has an acoustic velocity of approximately 1300 to 1700 m/s. Various lens materials can be used having an acoustic velocity less than 1300 m/s, such as room temperature vulcanization (RTV) silicone, which has an acoustic velocity of approximately 900 to 1050 m/s.

Figure 7A:
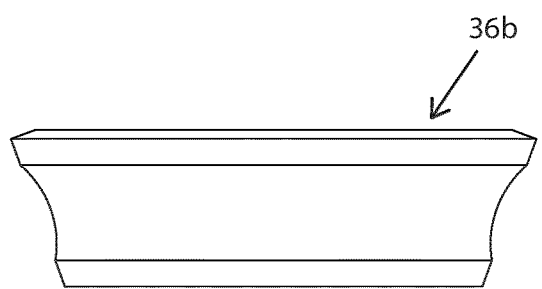
FIGS. 7A and 7B are side and perspective views, respectively, of a concave profile conical lens of a radial imaging probe.
Figure 7B:
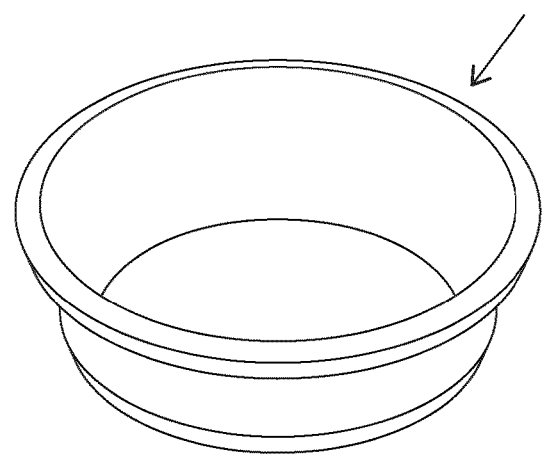

In another embodiment, shown in FIGS. 7A and 7B, a concave lens 36b is used in the radial probe 32. The material of the concave lens preferably has an acoustic impedance close to the fluid in the well, and has a higher acoustic velocity than the well fluid, i.e. 1700 m/s or greater. Suitable materials include hard plastics such as polymethylpentene (PMP or TPX), poly ether ether ketone (PEEK), polytetrafluoroethylene (PTFE), polyimide (PI), polyphenylene sulfide (PPS), or another material having suitable acoustic properties and mechanical strength at high temperatures.

Figure 8A:
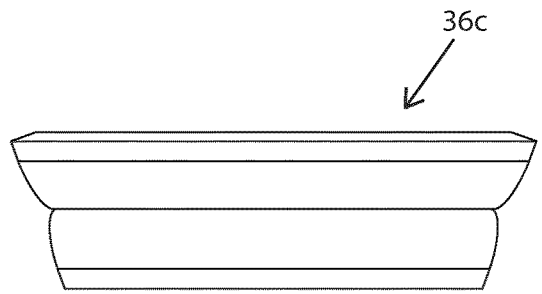
FIGS. 8A and 8B are side and perspective views, respectively, of a logarithmic profile conical lens of a radial imaging probe.
Figure 8B:
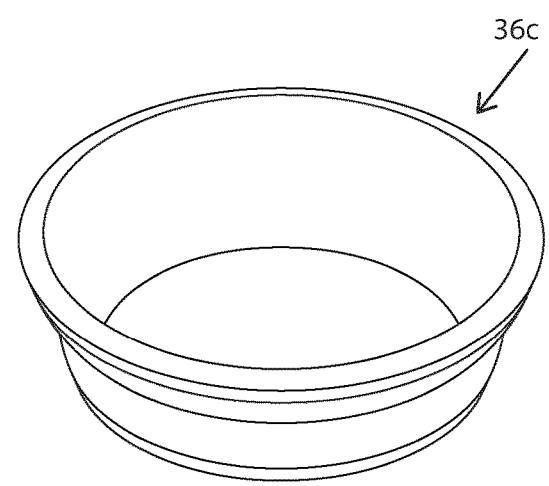

In a further embodiment, a logarithmic lens 36c is used, such as shown in FIGS. 8A and 8B. The logarithmic lens is shaped to create an extended focal zone that can produce sharp images at a range of distances, i.e. images having a high depth of field. Having an extended focal zone is advantageous because a range of depths from inside a well casing or liner to the outside of the casing or liner and everything in between can be imaged with the same tool. An extended focal zone also allows for wells having different diameters to be imaged with the same tool.

The logarithmic lens can be concave or convex. A concave logarithmic lens would be made of a material having a higher velocity than the fluid in the wellbore, such as polymethylpentene (PMP or TPX), poly ether ether ketone (PEEK), polytetrafluoroethylene (PTFE), polyimide (PI), polyphenylene sulfide (PPS). A convex logarithmic lens would be made of a material having a lower velocity than the wellbore fluid, such as RTV silicone.

Alternatively, no lens is used but instead the surface over the transducer elements is parallel with the surface of the transducer elements, i.e. the surface has the same curvature as the transducer array. This provides a simple and efficient design that can be thinner than embodiments having a lens, and can avoid imaging artifacts that may be created by a lens. With a flat surface, the probe relies on the natural focus zone of the transducer elements in the transducer array 34. The flat surface is preferably made of a hard plastic such as polymethylpentene (PMP or TPX), poly ether ether ketone (PEEK), polytetrafluoroethylene (PTFE), polyimide (PI) or polyphenylene sulfide (PPS).

Alternatively, each transducer element itself can be curved in a convex or concave manner to modify the focal point of the element.

Forward Imaging Module

Figure 11:
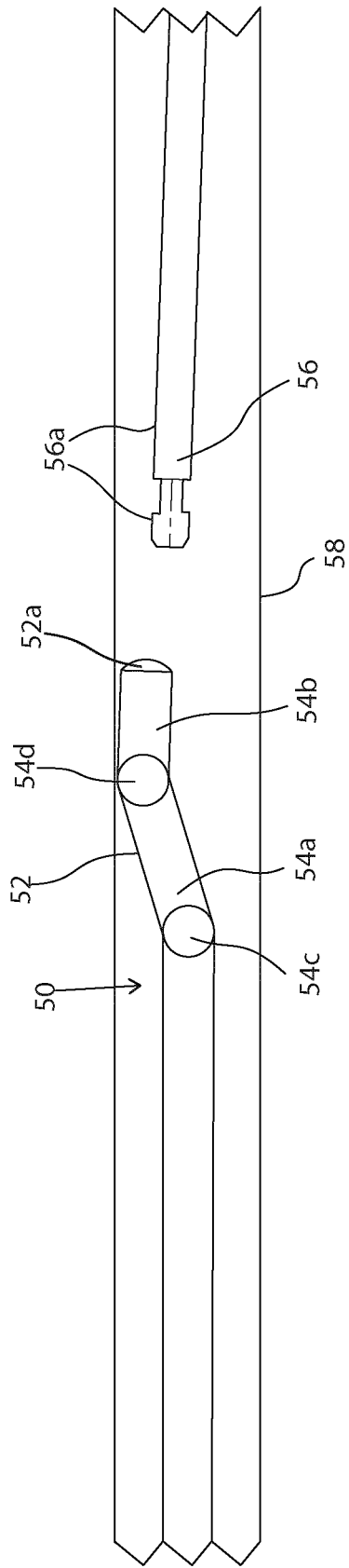
FIG. 11 is a schematic side view of a forward facing imaging module having an articulated arm in an obstructed wellbore.

FIG. 11 illustrates the forward imaging module 50 in a well liner 58. The forward imaging module 50 generally includes a forward imaging probe 52 having a forward facing ultrasonic transducer 52a with an adjustable viewpoint. The forward module also includes the necessary electronics for transmitting and receiving ultrasound from the forward imaging probe, converting analog signals to digital, and processing images. The forward imaging probe is primarily used for imaging obstructions 56 in the well, but it can also be operated in Doppler mode to obtain information on fluid flow in the well, and specifically on axial flow within the well.

The forward facing transducer includes a single element or an array of multiple elements. The multiple elements in the array may be configured in various arrangements, such as a linear array or 2D array. When the probe includes an array of elements, phased array imaging techniques are preferably used.

The transducer has an adjustable viewpoint for changing the position and/or angle of the viewpoint from which imaging occurs. The transducer viewpoint may be adjusted electronically or mechanically. To steer the transducer mechanically, the probe or a portion of the probe is physically moved to a different position and/or angle, thereby physically adjusting the viewpoint of the transducer. For example, as shown in FIG. 11, the probe may include an articulated arm for moving the transducer. The articulated arm may include one or more arm sections 54a, 54b that are connected by joints 54c, 54d which allow the arm sections to move with respect to each other. The forward imaging module would include the necessary driving mechanism, for e.g. a motor, and controls for controlling the movement of the articulated arm to adjust the angle and/or position of the transducer.

Other mechanical means for steering the transducer can also be used. Alternatively, the forward facing probe may include multiple transducers and/or reflectors located at different positions and/or angles to gather imaging data from multiple points of view.

The transducer viewpoint may instead be adjusted electronically. For example, the transducer may comprise a matrix 2D array that allows for electronic steering in two axes. Alternatively, the transducer can be steered using a combination of mechanical and electronic means. For example, the transducer may use a motorized 1D array that uses electronic focusing and beam steering along the axis of the array and mechanical steering along another axis for adjusting the viewpoint of the transducer.

By having an adjustable viewpoint transducer, imaging data can be collected from a number of points of view. An obstruction 56 in a well 58 often has one or more occluded surfaces 56a that cannot be imaged when an imaging device faces the obstruction straight on. By imaging the obstruction from multiple points of view, data can be captured on the occluded surfaces, as shown in FIG. 11. Multiple view points allow for a highly redundant and relatively occlusion and artifact free dataset to be created. The dataset can be used to provide a complete and accurate model of the obstruction. The adjustable viewpoint transducer also allows for a synthetic aperture that is much larger than the aperture provided by the element(s). This improves the quality of the focus and depth of field of the resulting data set.

Figure 12:
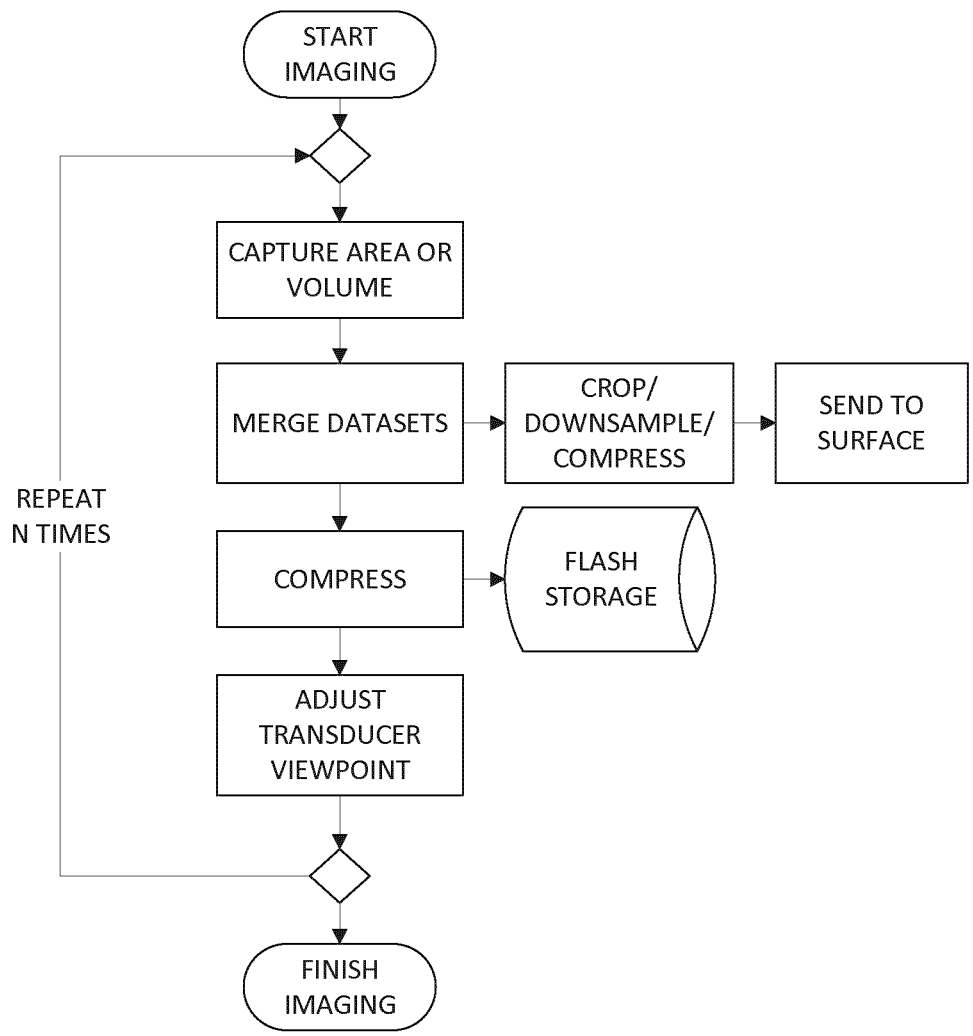
FIG. 12 is a flowchart of an imaging process using a forward facing imaging module.

FIG. 12 provides a flowchart showing the imaging process using the forward facing imaging module with an adjustable viewpoint transducer. First, the transducer is used to image an area in front of the probe. Next the viewpoint of the transducer is adjusted to change the position and/or angle, and further imaging occurs from the new viewpoint. The datasets captured from both viewpoints are merged to create an image of the area in front of the probe. This process can be repeated any number of times, resulting in a complete image of an area in a well, which may include an image of any obstructions present. After imaging, the datasets are stored onboard and/or sent to the well surface. If an array of elements is used, the areas imaged may be 3D volumes, which can then be combined to form a 3D image.

In one embodiment, data is collected at multiple frequencies. Alternatively, harmonic imaging is used where the receive frequency is two or more times the transmit frequency.

Imaging Modes for Radial Imaging Probe

Figure 9:
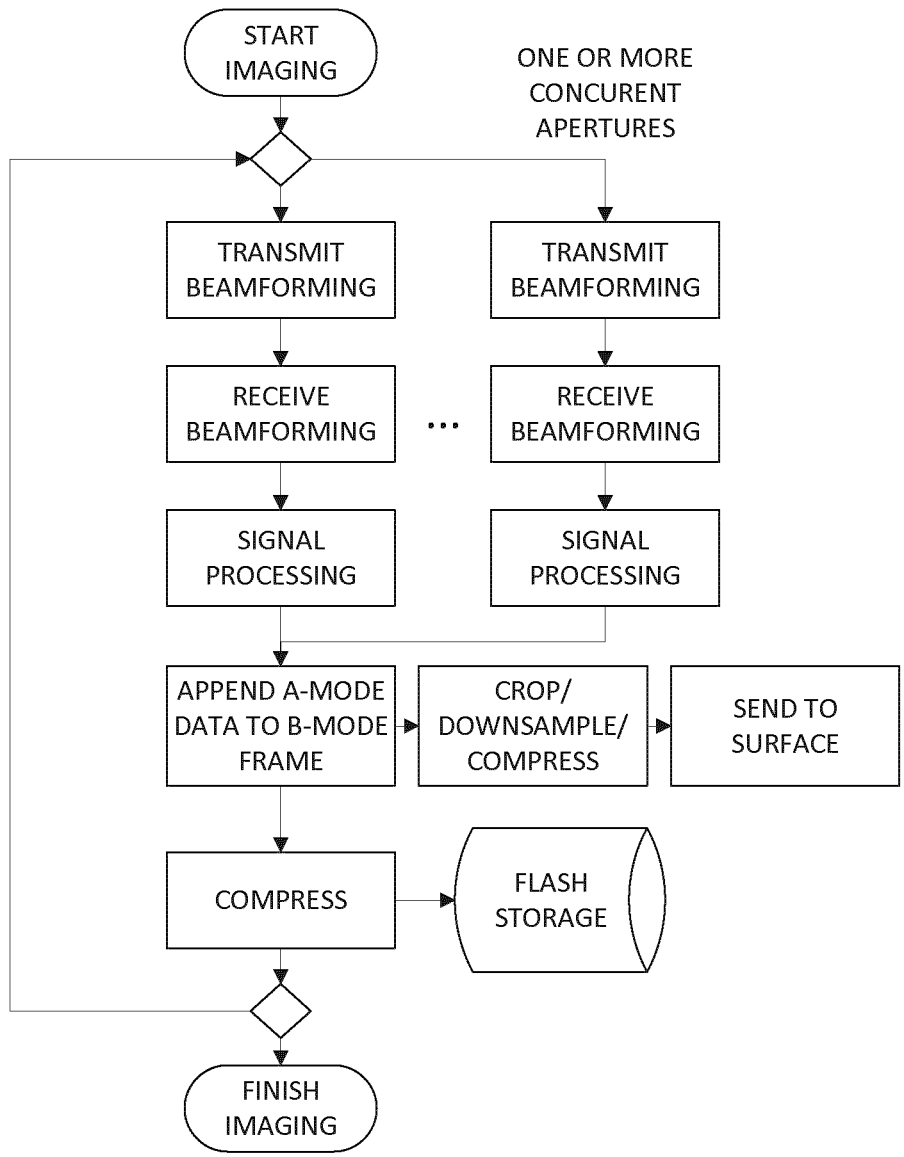
FIG. 9 is a flowchart of a multiple aperture imaging process for a radial imaging probe.
Figure 10:
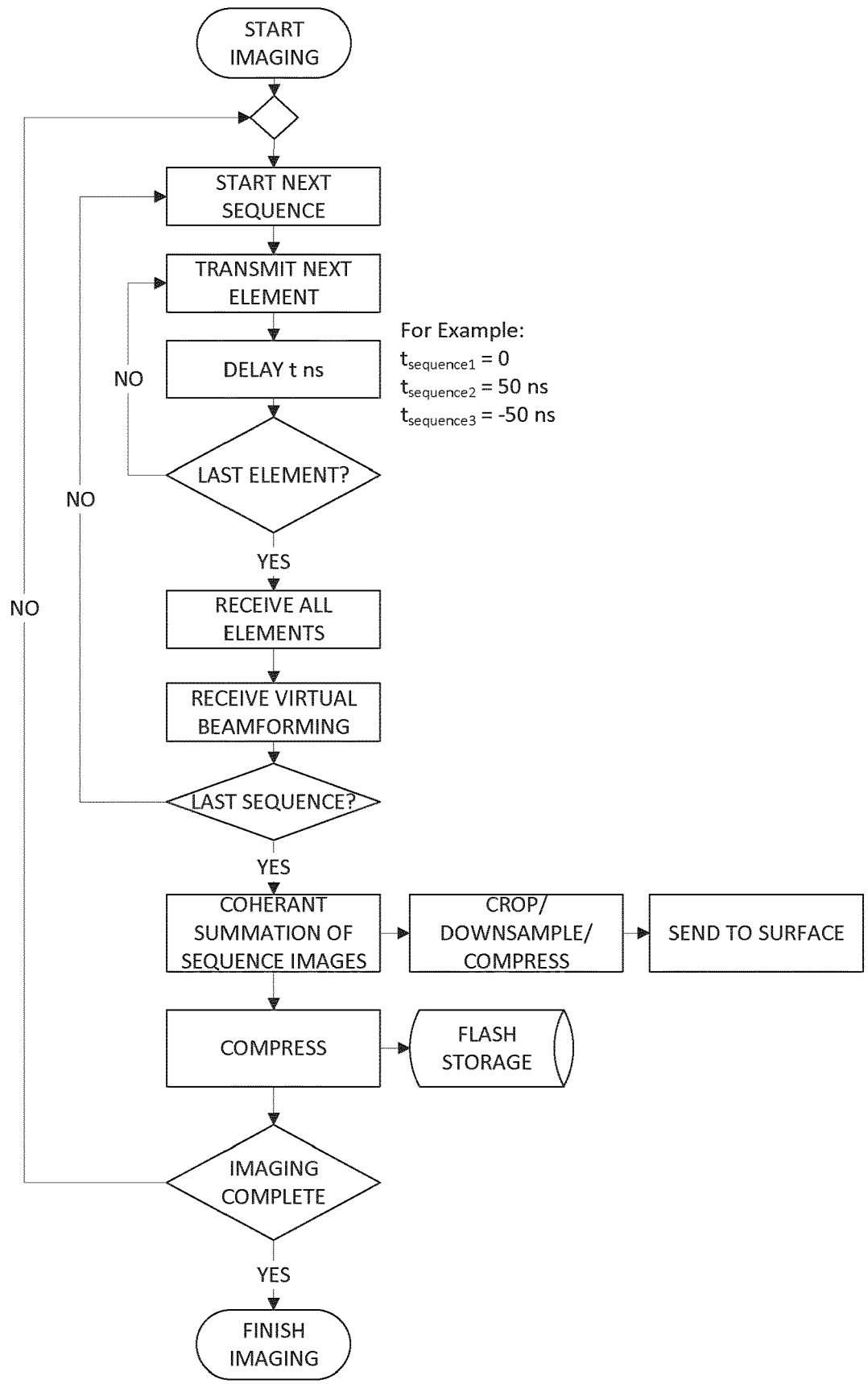
FIG. 10 is a flowchart of a spiral wave imaging process for a radial imaging probe.

FIGS. 9 and 10 illustrate alternative phased array imaging modes that can be used with the radial imaging probe, including multiple aperture imaging and spiral wave imaging, which can be used to improve image resolution. These alternative imaging modes increase the number of lines that can be scanned per second, effectively increasing the axial resolution, improving the depth of field and improving the image contrast over conventional phased array imaging.

FIG. 9 provides a flowchart showing a method for operating the radial probe in a multiple aperture imaging mode. In the multiple aperture imaging mode, one or more synthetic apertures comprising a group of elements concurrently transmit and receive signals, using beamforming to steer and focus the signals, as the radial probe is moved axially through a wellbore. The signals received from the multiple apertures are processed concurrently, and the resulting data is appended together to form a 3D image of the wellbore that is sent to the surface and/or stored onboard. Using multiple apertures concurrently allows for a faster scan rate which increases the resolution of the resulting images.

FIG. 10 provides a flowchart showing a method for operating the radial probe in a spiral wave imaging mode. In spiral wave imaging, a "spiral" wave is transmitted by pulsing all individual elements in a sequence, with a sequence referring to a row of elements on the transducer that encircles the radial probe, without applying beamforming. A time delay t may be applied between pulsing each element in a sequence to create a wave front that spirals outwardly in a radial direction from the probe. A positive time delay t, e.g. 50 ns, creates a spiral wave front travelling in one direction (e.g. clockwise), whereas a negative time delay t, e.g. −50 ns, creates a spiral wave front travelling in the opposite direction (e.g. counterclockwise). The time delay preferably ranges from −200 to 200 ns. If t=0, all the elements in a sequence are pulsed simultaneously to create a circular wave front that travels radially outward from the probe.

In spiral imaging, after all the elements in the sequence have received, time delays are applied to the receive signals to achieve virtual beamforming. This process is repeated for each sequence or row in the radial transducer, and then the signals from each sequence are coherently summed to form an image of the well. This image is then compressed and sent to the surface and/or stored onboard. The time delays applied in each sequence may be the same or different.

Spiral wave imaging advantageously allows for a faster scan rate which enables the radial probe to be moved through the well at a faster speed (e.g. 10× the speed compared to conventional phased array imaging mode), or if the speed of the radial probe is not increased, allows for higher resolution images to be formed (e.g. 10× the resolution compared to conventional phased array imaging mode).

Other Applications

The imaging device can be used for imaging water wells, pipelines, water mains, or any tubular.

The forward imaging module can be incorporated into a retrieval or fishing tool to allow real-time visualization of the fish (i.e. the item in the well to be retrieved) and the fishing procedure as it is carried out.

The forward imaging module can also be incorporated into imaging sonar for deep sea remotely operated vehicles.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A forward-facing imaging module for imaging a wellbore using ultrasound, the forward-facing imaging module comprising:
   a housing;
   an ultrasonic imaging probe having an adjustable viewpoint forward facing transducer for imaging an obstruction in the wellbore axially along a longitudinal axis of the forward-facing imaging module;
   a control mechanism that enables imaging the obstruction with an occluded surface from a first point of view to obtain a first dataset and imaging the occluded surface of the obstruction from at least one additional point of view by adjusting position and angle of the viewpoint of the ultrasonic imaging probe to obtain a redundant dataset of the obstruction; and
   electronics for transmitting and receiving ultrasound from the transducer.

2. The forward-facing imaging module of claim 1 wherein the transducer comprises multiple elements arranged in a linear array or a 2D array.

3. The forward-facing imaging module of claim 1 wherein the transducer is a phased array transducer.

4. The forward-facing imaging module of claim 1 wherein the transducer comprises a single element.

5. The forward-facing imaging module of claim 1 wherein the imaging probe comprises an articulated arm on which the transducer is located for changing one or both of the position and the angle of the transducer.

6. The forward-facing imaging module of claim 2 wherein the viewpoint of the transducer is adjusted by electronically steering the elements.

7. The forward-facing imaging module of claim 1 wherein the viewpoint of the transducer is adjusted using both mechanical and electronic steering.

8. A modular imaging tool comprising:
   the forward-facing imaging module of claim 1; and
   a telemetry module comprising power means, communication means and image processing means.

9. A method for imaging an obstruction in a wellbore using a forward-facing imaging module comprising a housing, an ultrasonic imaging probe having an adjustable viewpoint, and a control mechanism, the method comprising:
   transmitting and receiving ultrasound from a transducer of the ultrasonic imaging probe axially along a longitudinal axis of the forward-facing imaging module;
   imaging the obstruction having an occluded surface from a first point of view to obtain a first dataset;
   imaging said obstruction from at least one additional point of view capturing the occluded surface by adjusting position and angle of the adjustable viewpoint, using the control mechanism, to obtain a redundant dataset; and
   creating an image of the obstruction by merging the first and redundant datasets.

10. The forward-facing imaging module of claim 1, further comprising a radial imaging probe operable in one or both of 2D B-mode and Doppler mode.

11. The forward-facing imaging module of claim 1, further comprising one of:
   a convex acoustic lens having an acoustic velocity of 1300 m/s or less, and
   a concave acoustic lens having an acoustic velocity of 1700 m/s or more.

12. The forward-facing imaging module of claim 1, wherein the housing is made of titanium, aluminum bronze, beryllium copper, ceramic, ceramic composite, or carbon fiber composite.

13. The forward-facing imaging module of claim 1, wherein the occluded surface is caused by an obstruction in the wellbore.

14. The forward-facing imaging module of claim 1, further comprising using the redundant dataset to generate a model of an obstruction proximate the occluded surface.

15. The forward-facing imaging module of claim 1, wherein the ultrasonic imaging probe comprises an articulated arm having a plurality of arm sections.

16. The method of claim 9, wherein imaging the obstruction comprises a multiple aperture imaging mode comprising the steps of:
 a) transmitting and receiving an ultrasonic beam concurrently from each of at least two sub-apertures on a transducer array as the imaging probe is moved axially in the wellbore, each of the at least two sub-apertures comprising a plurality of individual elements;
 b) concurrently processing the received beam from each of the at least two sub-apertures to form signals; and
 c) appending the signals from each of the at least two sub-apertures to create a 3D image of the wellbore.

17. The method of claim 9 further comprising repeating imaging said obstruction from at least one additional point of view one or more times to obtain further datasets obtained from various viewpoints.

18. The method of claim 9 wherein the viewpoint is changed by mechanically changing one or both of the position and angle of the transducer.

19. The method of claim 9 wherein the transducer comprises a plurality of elements and the viewpoint is changed by electronically steering the elements.

20. The method of claim 9, wherein the imaging is phased array ultrasound imaging.

21. The method of claim 9, wherein merging the first and redundant datasets comprises performing a coherent summation of the first dataset and the redundant dataset.

* * * * *